(12) United States Patent
Matsui et al.

(10) Patent No.: US 10,850,363 B2
(45) Date of Patent: Dec. 1, 2020

(54) MANUFACTURING METHOD OF SEMICONDUCTOR DEVICE AND SEMICONDUCTOR MANUFACTURING APPARATUS

(71) Applicant: TOSHIBA MEMORY CORPORATION, Tokyo (JP)

(72) Inventors: Yukiteru Matsui, Aichi (JP); Takahiko Kawasaki, Aichi (JP); Akifumi Gawase, Mie (JP); Shuji Suzuki, Mie (JP); Tsutomu Miki, Mie (JP)

(73) Assignee: Toshiba Memory Corporation, Tokyo (JP)

( * ) Notice: Subject to any disclaimer, the term of this patent is extended or adjusted under 35 U.S.C. 154(b) by 920 days.

(21) Appl. No.: 14/843,550

(22) Filed: Sep. 2, 2015

(65) Prior Publication Data

US 2016/0207163 A1   Jul. 21, 2016

(30) Foreign Application Priority Data

Jan. 16, 2015   (JP) .................................. 2015-007017

(51) Int. Cl.
  *B24B 37/005*   (2012.01)
  *G01N 29/14*   (2006.01)
  *G01N 29/44*   (2006.01)
  *G01N 29/46*   (2006.01)

(52) U.S. Cl.
  CPC ......... *B24B 37/0053* (2013.01); *G01N 29/14* (2013.01); *G01N 29/4436* (2013.01); *G01N 29/46* (2013.01); *G01N 2291/2697* (2013.01)

(58) Field of Classification Search
  None
  See application file for complete search history.

(56) References Cited

U.S. PATENT DOCUMENTS 3,713,127 A * 1/1973 Keledy ................. G01B 17/04
                                                                340/540
4,685,335 A * 8/1987 Sato ....................... G01N 29/14
                                                                702/39

(Continued)

FOREIGN PATENT DOCUMENTS

JP   2000-24919   1/2000
JP   3189076      7/2001

(Continued)

OTHER PUBLICATIONS

Claims Machine Generated English Translation of Nomura Yoshihiro. JP2013084795.Published May 9, 2013 (Year: 2013).*

(Continued)

*Primary Examiner* — Sylvia MacArthur
(74) *Attorney, Agent, or Firm* — Finnegan, Henderson, Farabow, Garrett & Dunner, L.L.P.

(57) ABSTRACT

In accordance with an embodiment, a manufacturing method of a semiconductor device includes detecting elastic waves, and detecting or predicting an abnormality of the processing object occurring during polishing of the processing object. The elastic waves are generated from the processing object during the polishing. The abnormality is detected or predicted by analyzing the detected elastic waves.

7 Claims, 3 Drawing Sheets

(56) References Cited

U.S. PATENT DOCUMENTS

| | | | | |
|---|---|---|---|---|
| 5,719,796 | A * | 2/1998 | Chen | H01L 22/20 257/E21.525 |
| 5,913,105 | A * | 6/1999 | McIntyre | H01L 22/20 257/E21.525 |
| 6,424,137 | B1 | 7/2002 | Sampson | |
| 6,834,117 | B1 * | 12/2004 | Rao | H01L 22/12 250/370.01 |
| 8,599,379 | B2 * | 12/2013 | Sakai | G01N 21/9505 356/237.1 |
| 2006/0063383 | A1 * | 3/2006 | Pattengale, Jr. | B24B 37/013 438/689 |
| 2007/0061088 | A1 | 3/2007 | Ganesan et al. | |
| 2008/0274670 | A1 * | 11/2008 | Tada | B24B 9/065 451/6 |
| 2013/0217225 | A1 | 8/2013 | Hayakawa et al. | |
| 2013/0331004 | A1 | 12/2013 | Minamihaba et al. | |
| 2014/0262027 | A1 * | 9/2014 | Matsuo | G01B 11/303 156/345.13 |
| 2016/0207163 | A1 * | 7/2016 | Matsui | B24B 37/0053 |

FOREIGN PATENT DOCUMENTS

| | | |
|---|---|---|
| JP | 3198525 | 8/2001 |
| JP | 2002-160154 | 6/2002 |
| JP | 3292243 | 6/2002 |
| JP | 2003-37090 | 2/2003 |
| JP | 3424389 | 7/2003 |
| JP | 2010-186776 | 8/2010 |
| JP | 2012-192511 A | 10/2012 |
| JP | 2013-84795 | 5/2013 |

OTHER PUBLICATIONS

Claims Machine Generated English Translation of JP2000024949. Published Jan. 25, 2000 (Year: 2000).*
Specification Machine Generated English Translation of Nomura Yoshihiro. JP2013084795.Published May 9, 2013 (Year: 2013).*
Specification Machine Generated English Translation of JP2000024919. Published Jan. 25, 2000 (Year: 2000).*
Description of Drawings Machine Generated English Translation of JP2000024919.Published Jan. 25, 2000. (Year: 2000).*

* cited by examiner

MANUFACTURING METHOD OF SEMICONDUCTOR DEVICE AND SEMICONDUCTOR MANUFACTURING APPARATUS

CROSS-REFERENCE TO RELATED APPLICATIONS

This application is based upon and claims the benefit of priority from the prior Japanese Patent Application No. 2015-007017, filed on Jan. 16, 2015, the entire contents of which are incorporated herein by reference.

FIELD

Embodiments described herein relate generally to a manufacturing method of a semiconductor device and a semiconductor manufacturing apparatus.

BACKGROUND

In recent years, new structures have been suggested regarding semiconductor devices along with the advance of miniaturization. For example, an air gap structure which is advantageous to higher capacity and lower power consumption has been introduced in semiconductor memories of the 1Xnm generation or later.

However, the air gap structure has a drawback of deteriorating the mechanical strength of a device. Therefore, the use of a normal chemical mechanical polishing (hereinafter referred to as "CMP") technique that uses slurry causes a scratch and also causes the collapse of an air gap due to shear stress during the CMP, and a crack may occur accordingly.

It is desired that the occurrence of such a crack should be detected in real time or predicted as a damage abnormality during the polishing rather than being found for the first time in a wafer defect inspection after the polishing.

DETAILED DESCRIPTION

In accordance with an embodiment, a manufacturing method of a semiconductor device includes detecting elastic waves, and detecting or predicting an abnormality of the processing object occurring during polishing of the processing object. The elastic waves are generated from the processing object during the polishing. The abnormality is detected or predicted by analyzing the detected elastic waves.

Embodiments will now be explained with reference to the accompanying drawings. Like components are provided with like reference signs throughout the drawings and repeated descriptions thereof are appropriately omitted.

It is to be noted that the accompanying drawings illustrate the invention and assist in the understanding of the illustration and that the shapes, dimensions, and ratios in each of the drawings are different in some parts from those in an actual apparatus.

In the specification of the present application, terms indicating directions such as the top and the bottom in the description represent relative directions when the surface of a polishing table on which an abrasive cloth is mounted is the top in the description of a CMP apparatus and when the surface of a substrate on which a polishing object is formed is the top in the description of a processing object. Therefore, the directions may be different from actual directions based on gravitational acceleration directions.

(A) CMP Apparatus

Figure 1:
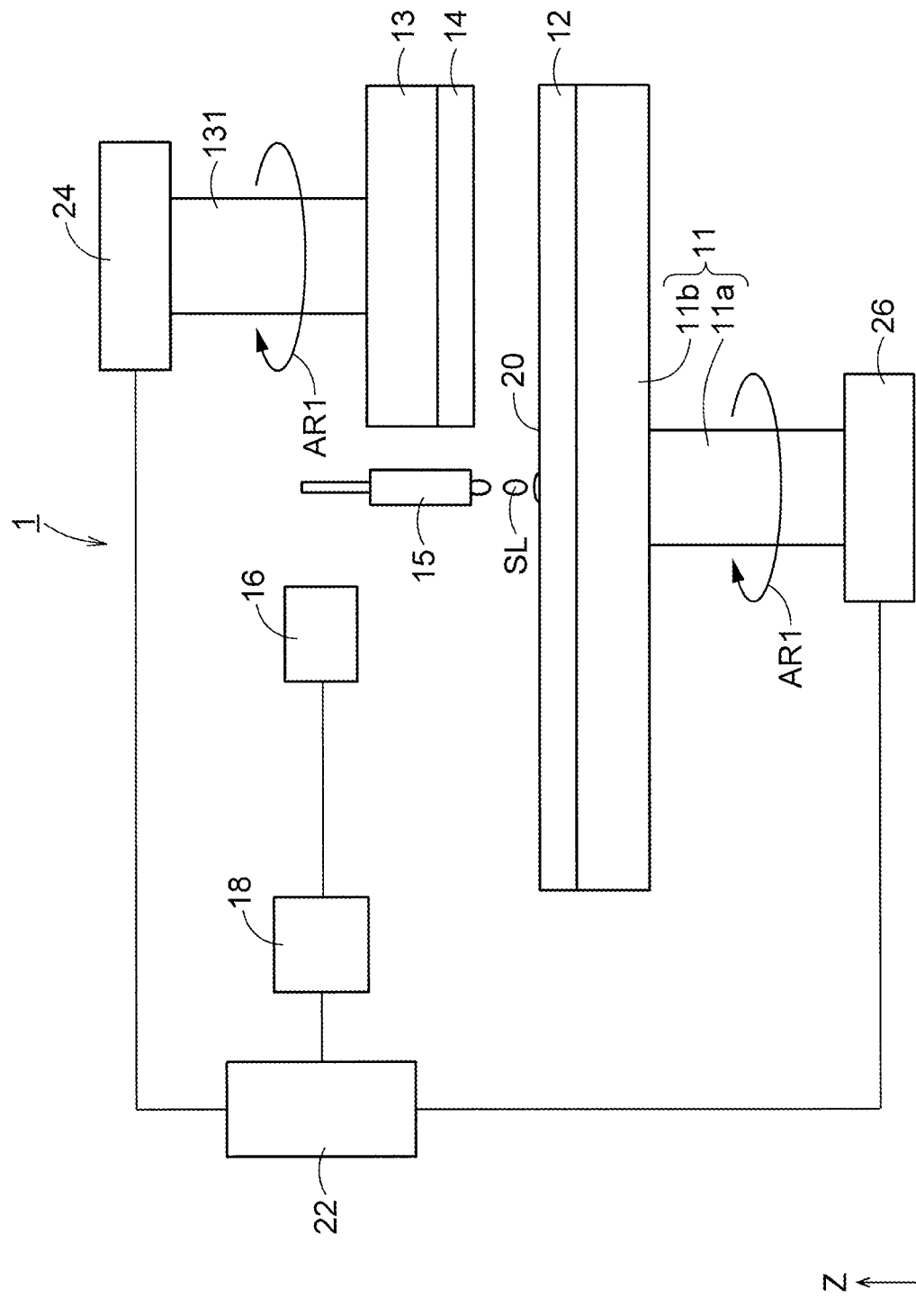
FIG. 1 is an example of a block diagram showing a schematic configuration of a semiconductor manufacturing apparatus according to one embodiment.

FIG. 1 is an example of a block diagram showing a schematic configuration of a semiconductor manufacturing apparatus according to one embodiment. A CMP apparatus 1 shown in FIG. 1 includes a seat part 11, a second driving part 26, an abrasive cloth 12, a holding part 13 which holds a processing object 14, a first driving part 24, a supply part 15, an acoustic emission (hereinafter properly referred to as "AE") sensor 16, an elastic wave processing part 18, and a control computer 22.

The seat part 11 has a polishing table shaft 11a, and a polishing table 11b coupled to the polishing table shaft 11a. The polishing table shaft 11a is coupled to the second driving part 26.

The second driving part 26 includes driving means such as an unshown motor. The second driving part 26 is connected to the control computer 22, and rotates and drives the polishing table 11b via the polishing table shaft 11a in accordance with an instruction signal from the control computer 22. In the present embodiment, the polishing table 11b corresponds to, for example, a second table, and the second driving part 26 corresponds to, for example, a second driving part.

The holding part 13 is coupled to the first driving part 24 via a shaft 131.

The first driving part 24 includes driving means such as an unshown motor. The first driving part 24 is connected to the control computer 22, and rotates and drives the holding part 13 via the shaft 131 in accordance with an instruction signal from the control computer 22. The first driving part 24 is not only capable of rotating and driving the holding part 13 but also capable of moving the holding part 13 in any of X-, Y-, and Z-directions that constitute three dimensions. For example, when a surface 20 of the abrasive cloth 12 is disposed parallel to an X-Y plane as shown in FIG. 1, the first driving part 24 moves the holding part 13 in the Z-direction while the holding part 13 is holding the processing object 14, and thereby causes the processing object 14 to contact the surface 20 of the abrasive cloth 12.

In the present embodiment, the holding part 13 corresponds to, for example, a first table, and the first driving part 24 corresponds to, for example, a first driving part.

The seat part 11 and the holding part 13 are preferably rotated and driven together from the perspective of eliminating the unevenness of the polishing amount of the processing object 14. When these parts are rotated and driven, the rotation direction of the holding part 13 and the rotation direction of the seat part 11 are preferably the same as indicated by the arrow AR1 in FIG. 1. Although both the polishing table 11b and the holding part 13 rotate in the direction of the arrow AR1 in the case shown in FIG. 1, it should be understood that these parts do not exclusively rotate in this direction, and may rotate in a direction opposite to the arrow AR1.

The supply part 15 is located above the seat part 11, for example, above the center of a circle when the seat part 11 is circular cylindrical, and the supply part 15 supplies a slurry SL to the surface 20 of the abrasive cloth 12. The slurry SL includes, for example, a chemical such as an abrasive, and water.

A phenomenon in which a substance emits sound as elastic waves when deformed and broken is referred to as acoustic emission (AE). The AE sensor 16 provided in the CMP apparatus 1 shown in FIG. 1 detects abnormal noise and vibration emitted from the processing object 14 during polishing. The AE sensor 16 is connected to the elastic wave processing part 18, and supplies the abnormal noise and vibration detected during polishing to the elastic wave processing part 18 as elastic wave data.

The elastic wave processing part 18 analyzes the elastic wave data supplied from the AE sensor 16 in accordance with a procedure that will be described later. The elastic wave processing part 18 is connected to the control computer 22, and supplies the analytic result to the control computer 22.

The control computer 22 determines the continuation of a polishing process or the change or suspension of polishing conditions on the basis of the analytic result provided from the elastic wave processing part 18. Then, the control computer 22 generates necessary instruction signals and supplies the instruction signals to the second driving part 26 and the first driving part 24. When the analytic result provided from the elastic wave processing part 18 includes the occurrence of a scratch or a crack (hereinafter briefly referred to as a "scratch/crack"), the control computer 22 generates a signal instructing to suspend polishing.

A polishing method that uses the CMP apparatus 1 shown in FIG. 1 is described as a manufacturing method of a semiconductor device according to one embodiment. In the polishing method according to the present embodiment, the slurry SL is supplied from the supply part 15. The processing object 14 is moved toward the seat part 11 by the first driving part 24 so that the processing object 14 contacts a polishing layer of the abrasive cloth 12. The processing object 14 is rotated and at the same time moved in the X-Y plane by the first driving part 24. In addition, the polishing table 11b is rotated by the second driving part 26 to polish the processing object 14.

During polishing, the AE sensor 16 detects the elastic waves from the processing object 14. The elastic wave processing part 18 analyses the elastic wave data from the processing object 14 by using a recognition technique, and detects whether the processing object 14 has been scratched/cracked, or predicts the type and degree of a scratch/crack that may occur. When the occurrence of the scratch/crack is detected or predicted, the elastic wave processing part 18 supplies the detection result or prediction result (hereinafter briefly referred to as a "detection/prediction result") to the control computer 22. The control computer 22 determines the suspension of the polishing process or the change or continuation of the polishing conditions on the basis of the detection/prediction result sent from the elastic wave processing part 18.

When judging from the detection/prediction result by the elastic wave processing part 18 that the scratch/crack has already occurred and the degree of the scratch/crack is too high to continue the polishing, the control computer 22 generates a signal instructing to suspend the polishing, and then supplies the signal to the second driving part 26 and the first driving part 24. Consequently, the polishing process is suspended, and the processing object 14 is sent to an inspection process.

When the scratch/crack has not occurred yet but the time of the occurrence can be predicted from the detection/prediction result by the elastic wave processing part 18, the control computer 22 sets a polishing end time point before the occurrence of the scratch/crack. The control computer 22 continues the polishing process until this time point. When the polishing end time point comes, the control computer 22 generates a signal instructing to suspend the polishing, and then supplies the signal to the second driving part 26 and the first driving part 24. Consequently, the polishing process is finished.

(B) Monitoring Method

Next, a method of specifically detecting and predicting the occurrence of the scratch/crack by the AE sensor 16 and the elastic wave processing part 18 is described below as an embodiment of a monitoring method.

(1) Embodiment 1

Elastic waves from the processing object 14 are detected by the AE sensor 16 during the polishing of the processing object 14, and the obtained elastic waves are analyzed by the elastic wave processing part 18. In the present embodiment, the elastic waves are analyzed by a frequency analysis that uses Fourier transform.

Figure 2:
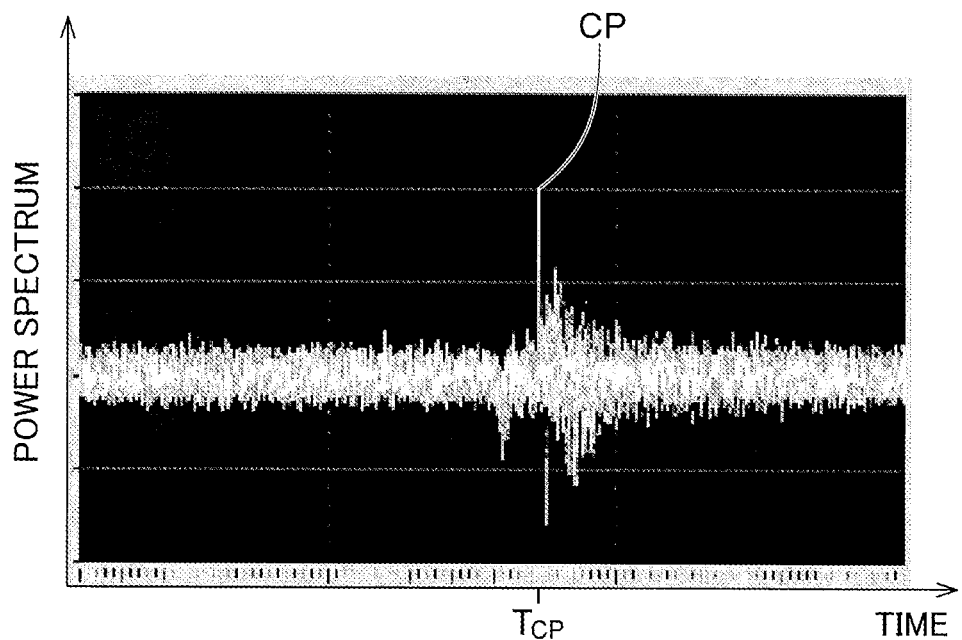
FIG. 2 is a diagram showing an example of a power spectrum obtained by an elastic wave processing part of the semiconductor manufacturing apparatus shown in FIG. 1.

More specifically, time-series power spectrum data is acquired by the elastic wave processing part 18 in accordance with the frequency analysis that uses Fourier transform. An example of such power spectrum data is shown in FIG. 2.

A change point in the obtained power spectrum data is then detected by the elastic wave processing part 18. In the example shown in FIG. 2, a point CP which has considerably diverged from the spectrum running on a time-series basis with a predetermined width is detected as the change point.

Figure 3:
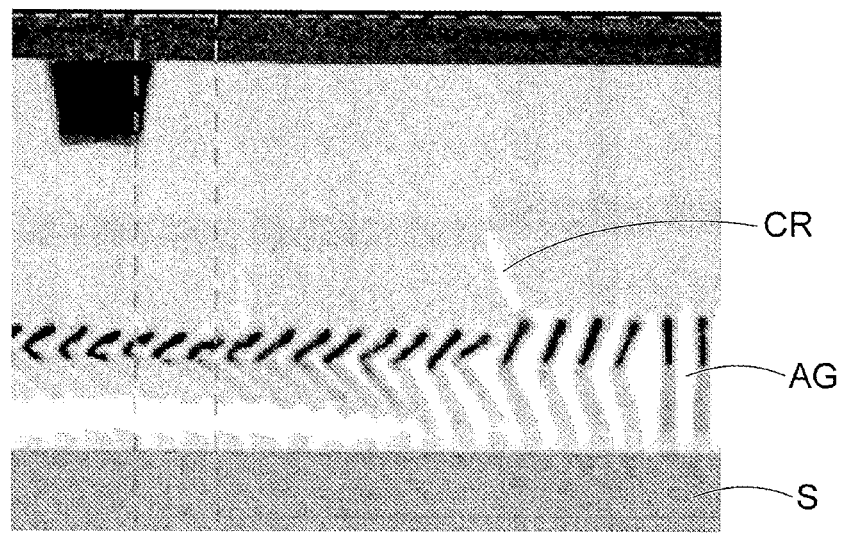
FIG. 3 is a diagram showing an example of an image in which the section of a cracked processing object is observed.

FIG. 3 shows an example of a sectional SEM image in which such a change point CP has been detected and which has been obtained from the processing object 14. In this example, a semifinished product of a NAND type semiconductor storage device in which an air gap AG is formed is used as the processing object 14. As shown in FIG. 3, it is found out that a memory cell has collapsed because of the occurrence of a crack CR in a film to be processed on a semiconductor substrate S in the processing object 14 in this example.

When such a serious crack occurs, the processing object 14 in the process of manufacture has to be destroyed. However, data regarding an occurrence time point Tcp of the detected change point CP is fed back to the subsequent polishing process of the processing object 14 so that the polishing will end at a time point that dates back a predetermined time from the occurrence time point. When the scratch/crack is light and reworking is possible in the subsequent manufacturing process, the reworking is performed.

According to the present embodiment, it is possible to detect in real time the occurrence of a damage abnormality during polishing such as a scratch/crack by conducting the frequency analysis that uses Fourier transform for the elastic wave data obtained from the processing object 14. Consequently, it is possible to improve the yield in the CMP process.

(2) Embodiment 2

In the present embodiment, reference data is prepared, and a pattern recognition that uses the reference data is performed for the elastic wave data obtained by the AE sensor 16 during the polishing of the processing object 14. In this way, the type and degree of a scratch/crack that may occur in the future can be predicted.

Figure 4:
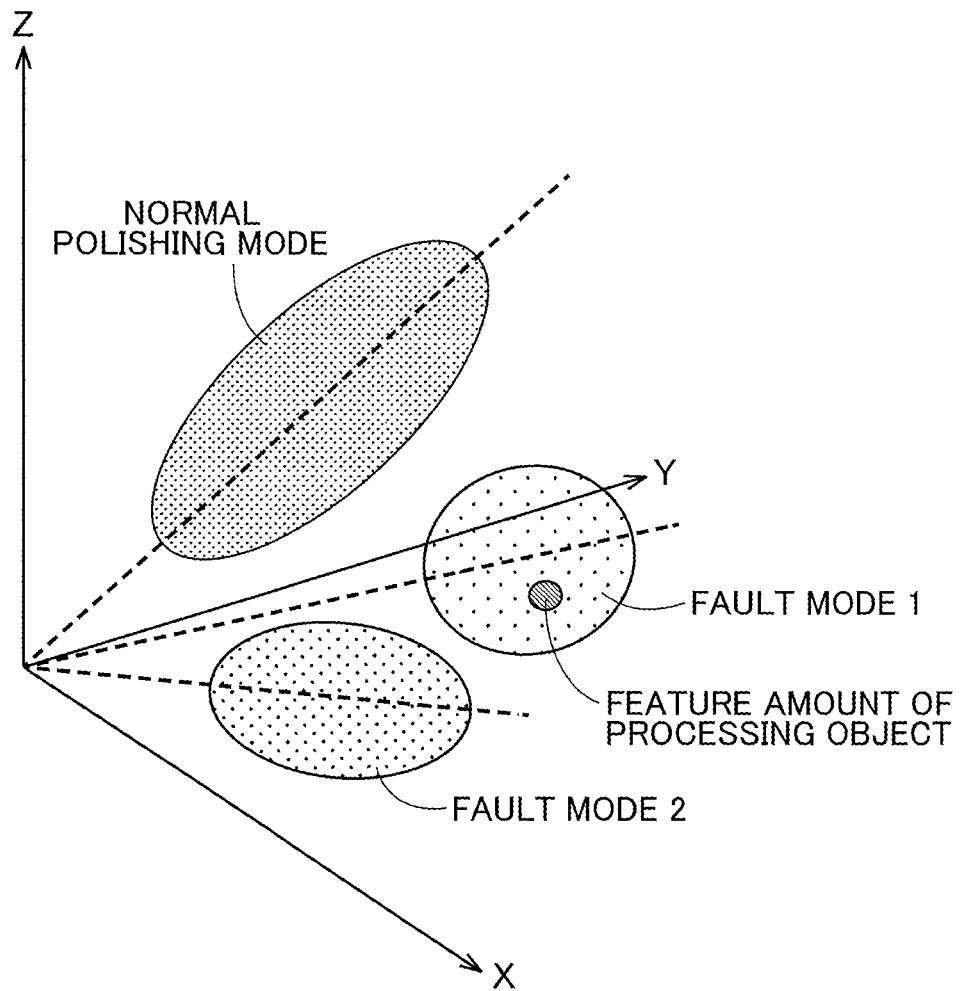
FIG. 4 is a diagram showing an example of reference data used for pattern recognition by the elastic wave processing part of the semiconductor manufacturing apparatus shown in FIG. 1.

An example of reference data used in a monitoring method according to the present embodiment is shown in FIG. 4.

The reference data shown in FIG. 4 are obtained as follows: Data regarding elastic waves in the case where polishing is finished without the occurrence of a scratch/crack is collected. Moreover, data regarding elastic waves is also collected for each type and degree of a scratch/crack when the scratch/crack actually occurs. The data are plotted in a multidimensional feature space having feature amounts as axes, and categorized into a normal polishing mode and various fault modes. In the example shown in FIG. 4, for brevity of explanation, an X-axis, a Y-axis, and a Z-axis respectively correspond to three kinds of first to third feature amounts for three-dimensional plotting. However, in general, more kinds of feature amounts are calculated, and four or more higher dimensions are used. For the calculation of the feature amounts, it is possible to use, for example, numerical data obtained by performing a frequency analysis for elastic wave data using Fourier transform. However, the processing method of the elastic wave data for the calculation of the feature amounts and the calculation method of the feature amounts are not limited.

Elastic waves from the processing object 14 are then detected by the AE sensor 16 during the polishing of the processing object 14, and the obtained elastic waves are plotted in the feature space of the reference data. A fault mode which is most similar to the plotted actual elastic wave data is identified, so that the type and degree of a scratch/crack that can occur due to the continuation of polishing can be predicted.

According to the present embodiment, the type and degree of a scratch/crack are identified by fitting that uses the reference data for the elastic wave data obtained from the processing object 14, so that it is possible to predict the occurrence of a damage abnormality during polishing such as a scratch/crack before the scratch/crack reaches an extensive degree. Consequently, it is possible to further improve the yield in the CMP process.

Although the elastic wave data in the case where a scratch/crack has actually occurred is used as the reference data in the above description, this reference data is not limited to this. If possible, for example, reference data created by use of a simulation may be used. It should be noted that the specific method of the pattern recognition is not specially limited to a particular method.

According to the monitoring method in at least one embodiment described above, the frequency analysis that uses Fourier transform or the pattern recognition that uses the previously obtained reference data is performed for the elastic waves detected during the polishing of the processing object, so that it is possible to detect or predict in real time the occurrence of a damage abnormality during polishing such as a scratch/crack.

Moreover, according to the manufacturing method of the semiconductor device in at least one embodiment described above, the frequency analysis that uses Fourier transform or the pattern recognition that uses the previously obtained reference data is performed for the elastic waves detected during the polishing of the processing object, so that it is possible to detect or predict in real time the occurrence of a damage abnormality during polishing such as a scratch/crack.

Furthermore, the semiconductor manufacturing apparatus in at least one embodiment described above has an AE sensor and an elastic wave processing part. The AE sensor detects elastic waves that occur due to the deformation or breakage of a film to be processed during the polishing of the film to be processed. The elastic wave processing part performs the frequency analysis that uses Fourier transform or the pattern recognition that uses the previously obtained reference data for the elastic waves detected by the AE sensor, and thereby detects or predicts the occurrence of a scratch or a crack. Therefore, it is possible to detect or predict in real time the occurrence of a damage abnormality during polishing such as a scratch/crack.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A semiconductor manufacturing apparatus comprising:
   a rotatable first table configured to hold a processing object;
   a rotatable second table having an abrasive cloth and configured to polish the processing object with the abrasive cloth;
   an AE sensor configured to detect elastic waves generated from the processing object during polishing of the processing object;
   an elastic wave processor configured to:
      plot first elastic wave data, second elastic wave data, and third elastic wave data in a multidimensional feature space having at least three axes of respective feature amounts,
      the first elastic wave data being data collected when polishing of each of sample processing objects is finished with neither a scratch nor a crack,
      the second elastic wave data being data collected when the scratch occurs during polishing of each of the sample processing objects, the second elastic wave data being classified depending on degree of the scratch,
      the third elastic wave data being data collected when the crack occurs during polishing of each of the sample processing objects, the third elastic wave data being classified depending on degree of the crack;

categorize the first to third elastic wave data plotted in the multidimensional feature space into a normal polishing mode, plural degrees of scratch fault modes, and plural degrees of crack fault modes;

plot fourth elastic wave data collected concurrently with polishing of a target processing object in the multidimensional feature space; and perform a pattern recognition to thereby analyze whether the fourth elastic wave data corresponds to either one of the normal polishing mode, the plural degrees of scratch fault modes and the plural degrees of crack fault modes concurrently with polishing of a target processing object in the multidimensional feature space; and a control computer configured to control the rotatable first table and the rotatable second table based on an analysis result provided by the elastic wave processor.

2. The apparatus of claim 1,
wherein the elastic wave processor analyzes the elastic waves by a frequency analysis that uses Fourier transform.

3. The apparatus of claim 2,
wherein the elastic wave processor detects the scratch fault mode or the crack fault mode by detecting a change point in time-series power spectrum data obtained by the frequency analysis.

4. The apparatus of claim 1,
wherein the scratch fault mode or the crack fault mode of the processing object occurring during the polishing is a scratch or a crack occurring in the processing object.

5. The apparatus of claim 1,
wherein the first to third elastic wave data is created by a simulation.

6. The apparatus of claim 1, wherein, when an occurrence of the scratch fault mode or the crack fault mode is detected or predicted, the elastic wave processor determines a suspension of the polishing process, a change of the polishing conditions or a continuation of the polishing.

7. The apparatus of claim 1, wherein the first to third elastic wave data has four or more higher dimensions.

* * * * *